United States Patent
Lee et al.

(10) Patent No.: US 7,079,330 B2
(45) Date of Patent: Jul. 18, 2006

(54) LENS HAVING ASPHERIC SURFACES

(75) Inventors: Chun-Yu Lee, Tu-cheng (TW);
Ming-Chiang Tsai, Tu-cheng (TW);
Tsung-Wei Chiang, Tu-cheng (TW)

(73) Assignee: Hon Hai Precision Industry Co., Ltd. (TW)

( * ) Notice: Subject to any disclaimer, the term of this patent is extended or adjusted under 35 U.S.C. 154(b) by 0 days.

(21) Appl. No.: 11/135,743

(22) Filed: May 24, 2005

(65) Prior Publication Data
US 2006/0056068 A1 Mar. 16, 2006

(30) Foreign Application Priority Data
Aug. 20, 2004 (CN) ........................ 2004 1 0051217

(51) Int. Cl.
*G02B 9/34* (2006.01)
(52) U.S. Cl. ...................... 359/781; 359/772; 359/773; 359/771; 359/774; 359/775
(58) Field of Classification Search ................ 359/781, 359/773, 663, 772, 771, 754, 774, 775, 686, 359/687, 688
See application file for complete search history.

(56) References Cited

U.S. PATENT DOCUMENTS

| | | | |
|---|---|---|---|
| 4,109,995 A * | 8/1978 | Betensky | 359/716 |
| 6,282,033 B1 | 8/2001 | Ning | 428/469 |
| 6,441,971 B1 | 8/2002 | Ning | 359/739 |
| 6,515,804 B1 * | 2/2003 | Watanabe et al. | 359/689 |
| 6,917,479 B1 * | 7/2005 | Park | 359/773 |
| 2004/0240080 A1 * | 12/2004 | Matsui et al. | 359/754 |

* cited by examiner

*Primary Examiner*—Timothy Thompson
(74) *Attorney, Agent, or Firm*—Morris Manning & Martin; Tim Tingkang Xia, Esq.

(57) ABSTRACT

A lens that can be used in a digital camera includes in sequence a first lens element (20), a second lens element (30), a third lens element (40), and a fourth lens element (50). The first lens element is biconvex, and includes a first aspheric surface (22) and a second aspheric surface (24). The second lens is biconcave, and includes a third aspheric surface (32) and a fourth aspheric surface (34). The third lens element is concavo-convex, and includes a fifth aspheric surface (42) and a sixth aspheric surface (44). The fourth lens element includes a seventh aspheric surface (52) and a eighth aspheric surface (54), the seventh aspheric surface and the eighth aspheric surface being wavelike. All of the lens elements are made from plastic. The lens is light, has strong impact resistance, and provides good image quality.

13 Claims, 3 Drawing Sheets

LENS HAVING ASPHERIC SURFACES

FIELD OF THE INVENTION

The present invention generally relates to lenses for devices such as digital cameras, and more particularly to a lens that has lens elements with aspheric surfaces.

BACKGROUND

Digital cameras utilizing high-resolution electronic imaging sensors typically require high resolution optical components such as lenses. In addition, the lenses generally must be very compact, so that they can be incorporated into devices such as palm-sized computers, cellular telephones, and the like.

Lenses for digital cameras generally have several individual lens elements. The lens elements are typically spherical, and usually create spherical aberration. Coma, distortion, and field curvature are also common optical aberrations that occur in the imaging process of a typical lens. A large number of lens elements are generally required in order to balance the inherent optical aberrations. Lenses having a large number of lens elements tend to be large, heavy, and expensive to manufacture. The cost of these lenses increases with the number of lens elements, and also results in increased costs in assembling and mounting the lens elements in a lens cell.

Further, conventional lenses commonly use one or more aspheric lens elements, each of which has one or two non-spherical surfaces. The aspheric lens elements are made of plastic or glass. Aspheric glass lens elements may be produced through glass molding methods, but the cost is high compared to aspheric plastic lens elements. In addition, aspheric glass lens elements generally have poor resistance to strong impact, and are easily damaged. Furthermore, glass lens elements are heavier than plastics lens elements, and militate against the trend toward lightweight digital cameras. In comparison, aspheric plastic lens elements may be easily produced by plastic injection molding, and are relatively inexpensive. A plastic lens element is light in weight, and does not easily break.

A typical lens having only spherical lens elements is disclosed in U.S. Pat. No. 6,282,033. The lens includes four lens elements. A first lens element is biconvex, a second lens element is biconcave, a third lens element is a meniscus, and a fourth lens element is biconvex. All of the lens elements are made of glass, and all their surfaces are spherical. Such spherical glass lens elements are relatively easy to make. However, the overall weight of the lens is unduly great. In addition, the lens elements are easily damaged if they are subjected to shock, such as when a digital camera is dropped to the ground. Furthermore, the spherical lens elements are apt to produce spherical aberration, thereby diminishing the image quality.

A typical lens having both spherical lens elements and aspheric lens elements is disclosed in U.S. Pat. No. 6,441,971. The lens includes three lens elements. A first lens element is a glass spherical meniscus. A second lens element and a third lens element are aspheric and made of plastic. The combination of a glass spherical lens element and plastic aspheric lens elements can decrease the overall weight of the lens. However, the impact resistance of the lens is still rather weak, and the lens may be easily damaged if the corresponding digital camera is dropped to the ground.

Accordingly, what is needed is a lens for a digital camera which is light, inexpensive, and has strong impact resistance.

SUMMARY

A module for a digital camera of a preferred embodiment consecutively comprises: a first lens element being biconvex, and including a first aspheric surface and a second aspheric surface; a second lens element being biconcave, and including a third aspheric surface and a fourth aspheric surface; a third lens element being concavo-convex, and including a fifth aspheric surface and a sixth aspheric surface; and a fourth lens element including a seventh aspheric surface and an eighth aspheric surface, the seventh aspheric surface and the eighth aspheric surface being wavelike. All of the lens elements are made of plastic.

Other objects, advantages and novel features will become more apparent from the following detailed description when taken in conjunction with the accompanying drawings, in which:

DETAILED DESCRIPTION OF THE PREFERRED EMBODIMENTS

Figure 1:
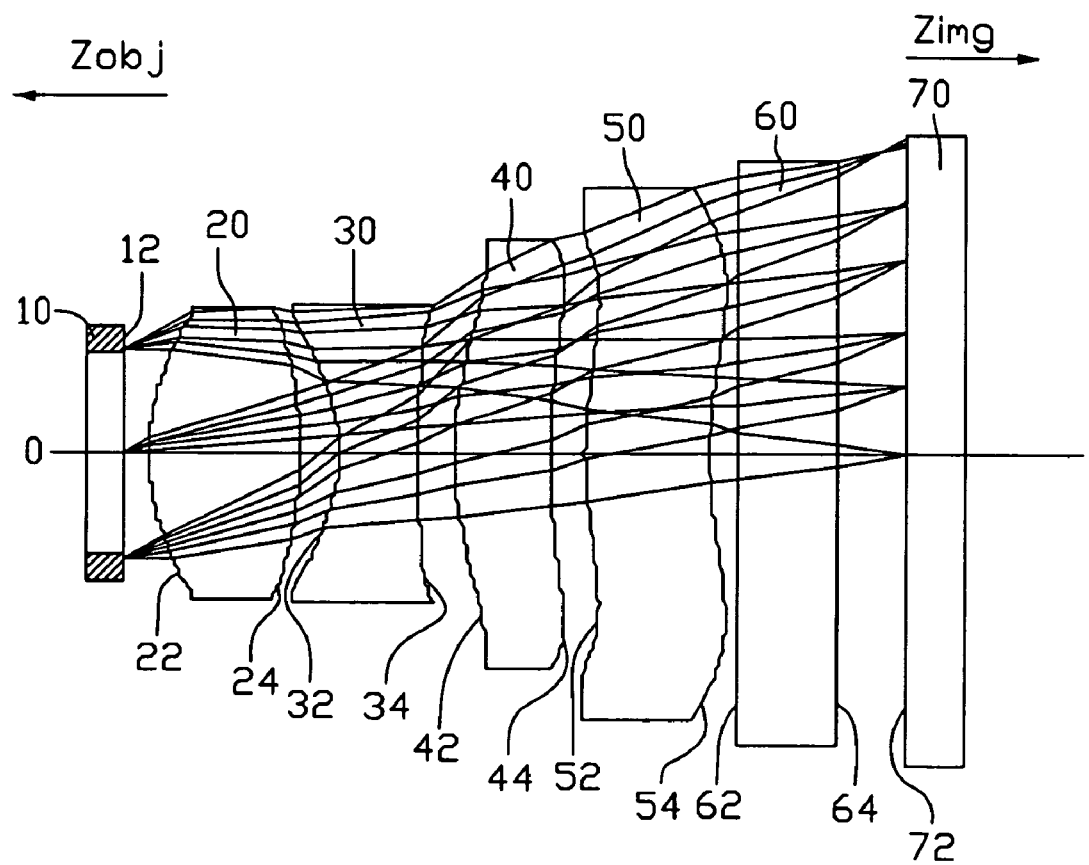
FIG. 1 is a schematic, side cross-sectional view of a lens for a digital camera according to a preferred embodiment of the present invention.

Referring to FIG. 1, an image acquiring module of a preferred embodiment includes an aperture stop 10, a first lens element 20, a second lens element 30, a third lens element 40, a fourth lens element 50, an optical board 60 and an imaging sensor 70, which are consecutively arranged in that order from an object side designated as $Z_{obj}$ to an image side designated as $Z_{img}$. An "O" line represents an optical axis of the lens. The first, second, third and fourth lens elements 20, 30, 40, 50 are defined as a lens group.

The aperture stop 10 includes a stop plane 12, which faces the first lens element 20. The aperture stop 10 is the first component to receive light rays when the lens is used. Therefore, it is convenient to control the light rays using the aperture stop 10.

The first lens element 20 is biconvex, and includes a first surface 22 and a second surface 24. The second lens element 30 is biconcave, and includes a third surface 32 and a fourth surface 34. The third lens element 40 is concavo-convex, and includes a fifth surface 42 and a sixth surface 44. The fifth surface 42 is convex to the object side of the third lens element 40, and the sixth surface 44 is concave to the image side of the third lens element 40. The fourth lens element 50 includes a seventh surface 52 and an eighth surface 54, with configurations of the seventh and eighth surfaces 52, 54 being wavelike. All of the lens elements 20, 30, 40, 50 are aspheric, and are symmetrically disposed about the "O" line respectively.

All of the lens elements 20, 30, 40, 50 are made of optical plastic. A refractive index designated as "n" and a dispersion coefficient designated as "v" of all of the lens elements 20, 30, 40, 50 need to satisfy the following requirements: 1.48<n<1.6, 25<v<66. The first lens element 20 and the third lens element 40 are preferably made from ZEO-E48R The refractive index of ZEO-E48R is 1.529, and the dispersion coefficient of ZEO-E48R is 55.8. The second lens element 30 and the fourth lens element 50 are preferably made from Polycarbonate (PC). The refractive index of PC is 1.585, and the dispersion coefficient of PC is 29.9. ZEO-E48R is a material produced by the Zeon Chemical Company in Japan. ZEO-E48R is an amorphous copolymer, and is a standard grade plastic used in molded optical lenses and prisms for still cameras and video cameras. ZEO-E48R has low moisture absorption, low birefringence, and high transparency. The first lens element 20 made of ZEO-B48R is disposed in front of the second lens element 30 made of PC, and the third lens element 40 made of ZEO-E48R is disposed in front of the fourth lens element 50 made of PC, so that the second lens element 30 and the fourth lens element 50 may effectively have reduced moisture absorption.

The optical board 60 is made of glass, and includes a first plane 62 and a second plane 64. The optical board 60 is preferably made from B270. The refractive index of B270 is 1.585, and the dispersion coefficient of B270 is 29.9. B270 is a commercially available glass obtainable from the Schott Company in Germany. At least one of the first and second planes 62, 64 of the optical board 60 is coated with an Infrared-cut (IR-cut) coating. The IR-cut coating can filter infrared rays, and hence improve image quality.

The image sensor 70 is located at the image side of the optical board 60. The image sensor 70 includes an image plane 72. The optical board 60 can protect the image plane 72 of the image sensor 70, so that dust or other contamination does not reach the image plane 72. The image sensor 70 is usually a Charge Coupled Device (CCD) or a Complementary Metal Oxide Semiconductor (CMOS). If the image sensor 70 is used in a digital camera of a mobile phone, the image sensor 70 is usually a CMOS for cost reasons. A pixel size of the CMOS of the present embodiment is 3.18 μm, and a resolution of the CMOS is about 200 mega-pixels.

Detailed structural parameters of the preferred embodiment of the lens are shown in FIG 1 and provided in Table 1. Surface radiuses and axial distances are shown in millimeters. The surfaces are identified according to the corresponding drawing reference, from the object side to the image side as shown.

TABLE 1

| Surface | Description | Radius (R) | Thickness (d) | Material | Diameter | Conic Constant (k) |
|---|---|---|---|---|---|---|
| 12 | Stop plane | ∞ | 0.2730343 | | 2.1357090 | 0 |
| 22 | First aspheric surface | 2.457711 | 1.536829 | ZEO-E48R | 2.903968 | 0 |
| 24 | Second aspheric surface | −5.097966 | 0.393383 | | 2.98868 | 0 |
| 32 | Third aspheric surface | −1.759531 | 0.7999754 | POLYCARBONATE | 2.890655 | 0 |
| 34 | Fourth aspheric surface | 113.5613 | 0.360614 | | 3.1009140 | 0 |
| 42 | Fifth aspheric surface | 3.363778 | 0.9950721 | ZEO-E48R | 3.780294 | 0 |
| 44 | Sixth aspheric surface | 8.657823 | 0.3417318 | | 4.342362 | 0 |
| 52 | Seventh aspheric surface | 3.737009 | 1.292685 | POLYCARBONATE | 4.511502 | 0 |
| 54 | Eighth aspheric surface | 4.097 | 0.3 | | 5.379964 | 0 |
| 62 | First plane | ∞ | 1 | B270 | 5.595392 | 0 |
| 64 | Second plane | ∞ | 0.7067018 | | 5.903027 | 0 |
| 72 | Image plane | ∞ | | | 6.452251 | 0 |

The aspheric surfaces are the surfaces 22, 24, 32, 34, 42, 44, 52 and 54, and describe the following equation:

$$z = \frac{cr^2}{1 + \sqrt{1 - (1+k)c^2 r^2}} + a_1 r^2 + a_2 r^4 + a_3 r^6 + a_4 r^8 + a_5 r^{10} + a_6 r^{12} \ldots$$

where:
Z is the surface sag;
C=1/R, where R, is the radius of the surface;
K is the conic constant;
r is the distance from the optical axis; and
$a_1, a_2, a_3, a_4, a_5$, and $a_6$ are the aspheric coefficients.

The asperie coefficients $a_1, a_2, a_3, a_4, a_5$, and $a_6$ are given by Table 2:

TABLE 2

| Surface | Description | $a_1$ | $a_2$ | $a_3$ | $a_4$ | $a_5$ |
|---|---|---|---|---|---|---|
| 22 | First surface | 0 | −0.0016316775 | −0.0045773514 | 0.0037113681 | −0.0011628219 |
| 24 | Second surface | 0 | −0.015469874 | −0.0038408094 | 0.0081234202 | −0.0026166386 |
| 32 | Third surface | 0 | 0.0395901 | 0.0155153 | −0.0022936988 | 0.00012468798 |
| 34 | Fourth surface | 0 | 0.0015972376 | 0.019844186 | −0.0066591493 | 0.0012334329 |
| 42 | Fifth surface | 0 | −0.024595083 | 0.0080551444 | −0.0028181858 | 0.0002417604 |
| 44 | Sixth surface | 0 | 0.000054409886 | −0.000044338835 | −0.0005657834 | 0.000011837942 |
| 52 | Seventh surface | 0 | −0.031405149 | 0.00014591649 | −0.000027462863 | 0.000010070785 |
| 54 | Eighth surface | 0 | −0.023387984 | −0.00048668057 | 0.000098341177 | 0.000001048872 |

The effective focal length of the lens is 5.98 mm in air, and the maximum aperture is f/2.8. The field of view is 55.99°. The lens is well suited for use with state-of-the-art digital sensors having a resolution about 1600*1200 pixels.

The performance of the lens of the preferred embodiment is illustrated in FIG. 2 through FIG. 5.

Figure 2:
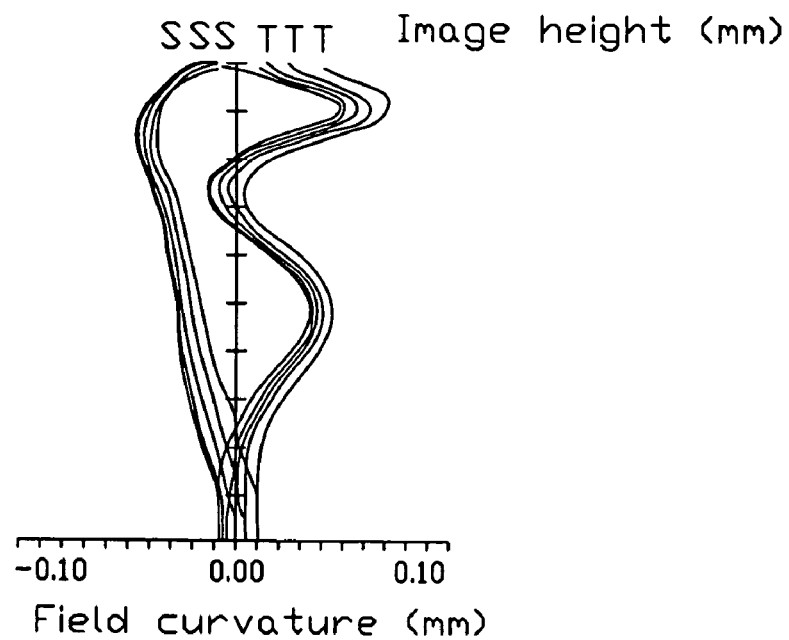
FIG. 2 is a graph of tangential (T) and sagittal (S) field curvatures of the lens of FIG. 1.

Referring to FIG. 2, field curvature represents the curved extent of the image plane when visible light is focused through a lens. Field curvature is very seldom totally eliminated. In many applications, it is not absolutely necessary to have the best correction. When cost is important, it is often wise to select a more modestly priced configuration, rather than have a high degree of correction. For the lens of the preferred embodiment, it can be seen that the tangential and sagittal field curvature is under 0.1 mm.

Figure 3:
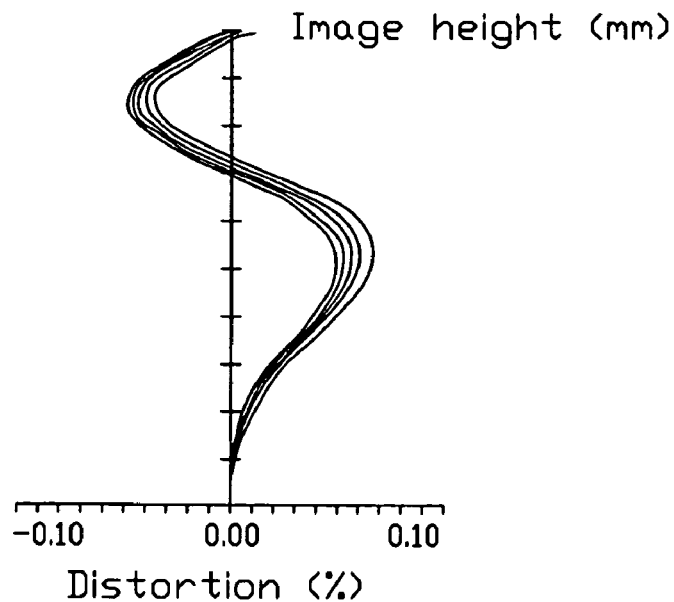
FIG. 3 is a graph of optical distortion of the lens of FIG. 1.

Referring to FIG. 3, optical distortion represents the inability of a lens to create a rectilinear image of the subject. The maximum geometric distortion of the lens of the preferred embodiment is typically higher than −0.1% and lower than +0.1%. These values indicate that the lens can provide crisp and sharp images with minimal field curvatures.

Figure 4:
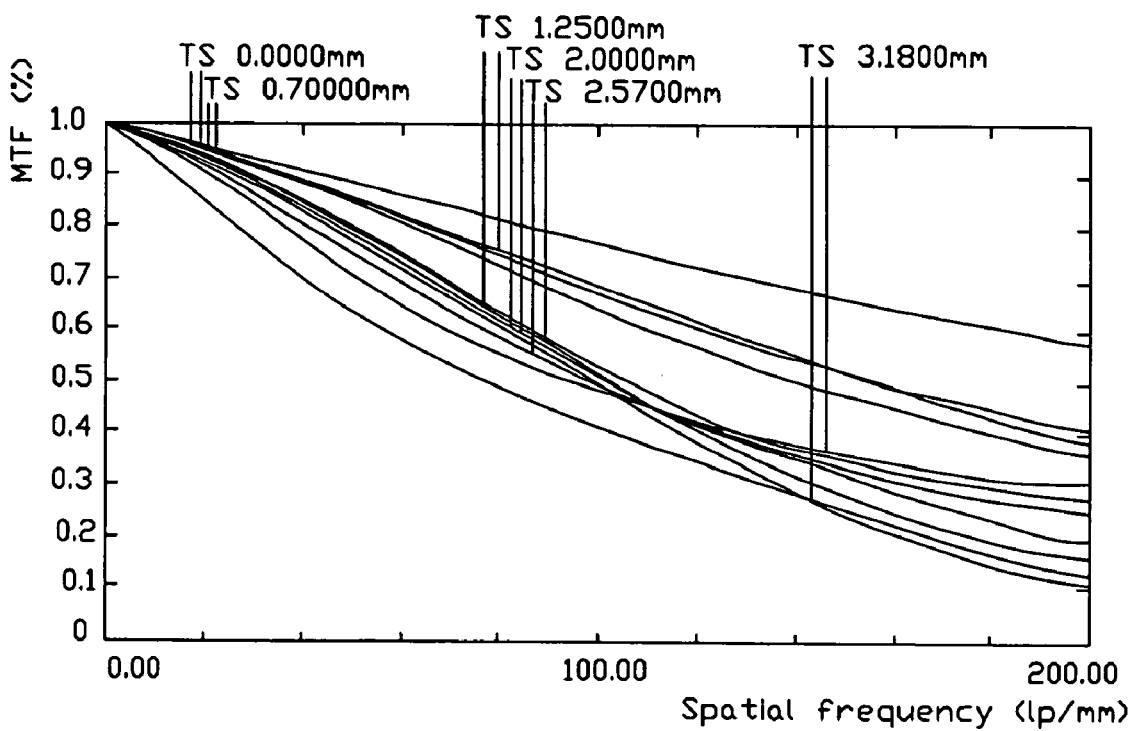
FIG. 4 is a graph of Modulation Transfer Function (MTF) versus spatial frequency for the lens of FIG. 1.
Figure 5:
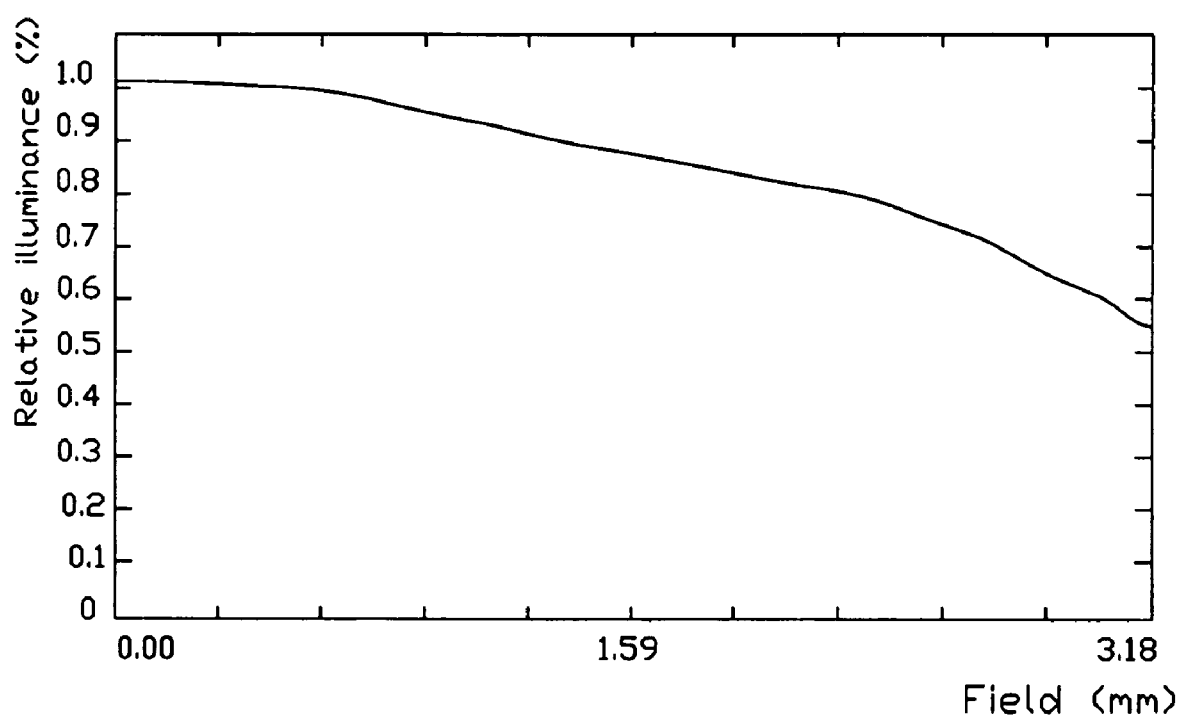
FIG. 5 is a graph of relative illuminance versus field for the lens of FIG. 1.

Referring to FIG. 4, Modulation Transfer Function (MTF) is the scientific means of evaluating the fundamental spatial resolution performance of an imaging system. When MTF is measured, an imaging height is divided into several fields. For each field, the MTF is measured. Each curved line represents the performance of the lens. The higher the value of the modulation transfer, the better the preservation of detail by the imaging system. When the spatial frequency is 100 lp/mm (line pairs per millimeter), the MTF of the lens of the preferred embodiment is higher than 40%. This is considered satisfactory for general imaging requirements. Referring to FIG. 5, the lowest value of relative illuminance for the lens of the preferred embodiment is higher than 50%. Usually when the value of relative illuminance is higher than 50%, it is considered satisfactory for general requirements.

In summary, the lens is light, has strong impact resistance, and provides good image quality. The lens may be used in various digital camera applications, including in personal digital cameras and other miniaturized electronic devices.

While certain specific relationships, materials and other parameters have been detailed in the above description of preferred embodiments, the described embodiments can be varied, where suitable, within the principles of the present invention. It should be understood that the preferred embodiments have been presented by way of example only and not by way of limitation. Thus the breadth and scope of the present invention should not be limited by the above-described exemplary embodiment, but should be defined according to the following claims and their equivalents.

We claim:

1. A lens for a digital camera, comprising:
   a first lens element being biconvex, and comprising a first aspheric surface and a second aspheric surface;
   a second lens element being biconcave, and comprising a third aspheric surface and a fourth aspheric surface;
   a third lens element being concavo-convex, and comprising a fifth aspheric surface and a sixth aspheric surface; and
   a fourth lens element comprising a seventh aspheric surface and an eighth aspheric surface, the seventh and the eighth aspheric surfaces being wavelike;
   wherein all of the lens elements are made of plastic,
   wherein each of the lens elements is symmetrically disposed about an optical axis of the lens, and
   wherein a refractive index n and a dispersion coefficient v of plastic material of the lens elements respectively satisfy the following requirements: 1.48<n<1.6, 25<v<66.

2. The lens for a digital camera as claimed in claim 1, wherein the refractive index n and the dispersion coefficient v of the first lens element and the third lens element satisfy the following requirements: n=1.529, v=55.8.

3. The lens for a digital camera as claimed in claim 1, wherein a material of the second lens element and the fourth lens element is Polycarbonate (PC).

4. The lens for a digital camera as claimed in claim 1, further comprising an aperture stop disposed in front of the first lens element.

5. The lens for a digital camera as claimed in claim 1, further comprising an optical board behind the fourth lens element.

6. The lens for a digital camera as claimed in claim 5, wherein the optical board is coated with at least one Infra-red-cut (IR-cut) coating.

7. The lens for a digital camera as claimed in claim 1, wherein the aspheric surfaces of the lens are defined by the equation, where:

$$z = \frac{cr^2}{1+\sqrt{1-(1+k)c^2r^2}} + a_1 r^2 + a_2 r^4 + a_3 r^6 + a_4 r^8 + a_5 r^{10} + a_6 r^{12} \ldots$$

Z is the surface sag,
C=1/R, where R is the radius of the surface,
K is the conic constant,
r is the distance from optical axis, and
$a_1$, $a_2$, $a_3$, $a_4$, $a_5$, $a_6$ are the aspheric coefficients.

8. The lens for a digital camera as claimed in claim 1, wherein a refractive index n and a dispersion coefficient v of plastic material of the lens elements respectively satisfy the following requirements: 1.48<n<1.6, 25<v<66.

9. A module for a digital camera, comprising:
   an aperture stop;
   a lens located behind the aperture stop, comprising;
   a first lens element being biconvex, the first lens element comprising a first aspheric surface and a second aspheric surface; a second lens element being biconcave, the second lens element comprising a third aspheric surface and a fourth aspheric surface; a third lens element being concavo-convex, the third lens element comprising a fifth aspheric surface and a sixth aspheric surface; and a fourth lens element comprising a seventh aspheric surface and an eighth aspheric surface, the seventh aspheric surface and the eighth aspheric surface being wavelike; wherein all of the lens elements are made of plastic;
   an optical board located behind the fourth lens, and including a first plane and a second plane; and
   an image sensor, the image sensor being located behind the optical board, and including an image plane,
   wherein a refractive index n and a dispersion coefficient v of plastic material of the lens elements respectively satisfy the following requirements: 1.48<n<1.6, 25<v<66, and wherein a refractive index n and a dispersion coefficient v of the first lens element and the third lens element satisfy the following requirements: n=1.529, v=55.8.

10. The module for a digital camera as claimed in claim 9, wherein a refractive index n and a dispersion coefficient v of the second lens element and the fourth lens element satisfy the following requirements: n=1.585, v=29.9.

11. An image acquiring module comprising:
an image sensor for accepting light from an object of said image acquiring module to generate desired image signals corresponding to said object;
an aperture stop disposed between said object and said image sensor so as to control an amount of said light entering said image acquiring module; and
a lens group disposed between said aperture stop and said image sensor for treating said entering light from said aperture stop before said entering light reaches said image sensor, said lens group comprising at least three plastic-made aspheric lens elements aligned with one another between said aperture stop and said image sensor for treatment of said light,
wherein a refractive index n and a dispersion coefficient v of plastic material of the lens elements respectively satisfy the following requirements: 1.48<n<1.6, 25<v<66, and wherein a refractive index n and a dispersion coefficient v of a first of the lens elements and a third of the lens elements satisfy the following requirements: n=1.529, v=55.8.

12. The image acquiring module as claimed in claim 11, wherein the at least three plastic-made aspheric lens elements is at least four plastic-made aspheric lens elements, and a refractive index n and a dispersion coefficient v of a second of the lens elements and a fourth of the lens elements satisfy the following requirements: n=1.585, v=29.9.

13. The image acquiring module as claimed in claim 11, wherein one of the at least three lens elements of said lens group is located right next to said image sensor and has at least one wavelike aspheric surface.

* * * * *